Feb. 23, 1932. I. GUBELMANN ET AL 1,846,681
PROCESS OF VACUUM DISTILLING WOOD ROSIN
Filed Sept. 2, 1927
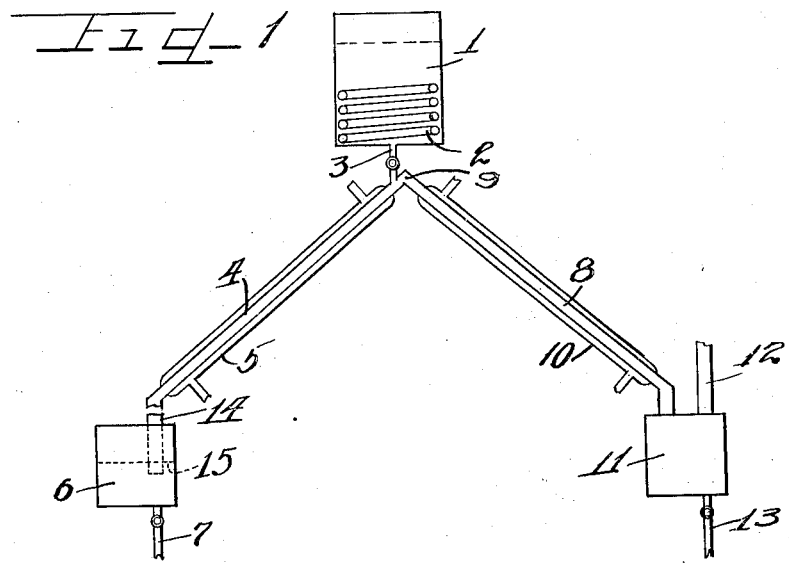
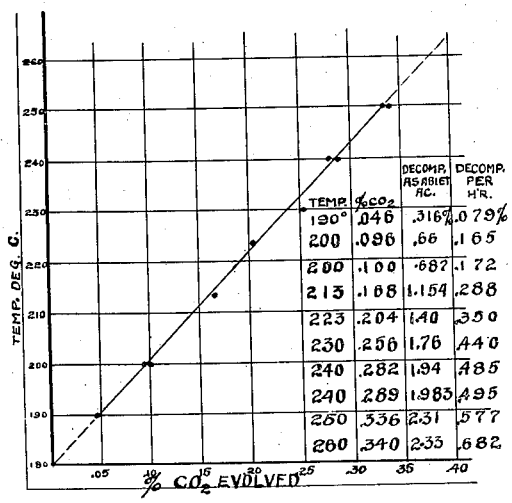
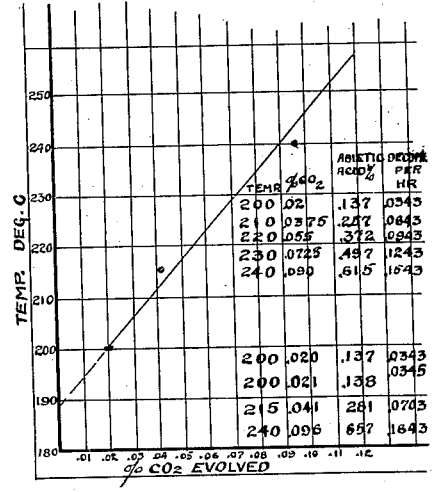
Inventors
Ivan Gubelmann
Henry R. Lee
by Charles N. Hill
Attys.

Patented Feb. 23, 1932

1,846,681

UNITED STATES PATENT OFFICE

IVAN GUBELMANN AND HENRY R. LEE, OF SOUTH MILWAUKEE, WISCONSIN, ASSIGNORS, BY MESNE ASSIGNMENTS, TO NEWPORT INDUSTRIES, INC., A CORPORATION OF DELAWARE

PROCESS OF VACUUM DISTILLING WOOD ROSIN

Application filed September 2, 1927. Serial No. 217,080.

This invention relates to a process of vacuum distilling wood rosin, whereby a maximum yield of high grade distillate may be obtained from crude and inferior grades of said rosin.

Heretofore the vacuum distillation of wood rosin on a large scale has never been performed to the best of our knowledge. The vacuum distillation of wood rosin on a small scale, however, has been carried out by a number of investigators without further precaution than that a high vacuum should be maintained during the distillation.

It is therefore an object of this invention to provide an efficient technical method for distilling inferior grades of wood rosin to obtain as distillates various grades of refined wood rosin varying in quality from that grade known to the trade as W—W wood rosin to X wood rosin.

Other and further important objects of this invention will become apparent from the following description and appended claims.

The Donk Patent No. 1,219,413 describes a method for vacuum distilling rosin whereby the rosin is distilled in a special type of still, the rosin being charged in continuously and the non-volatile residue being removed intermittently. While this procedure constitutes an improvement over former known methods of vacuum distilling rosin, it nevertheless overlooks certain fundamental conditions essential to the efficient distillation of rosin.

These limiting conditions under which the distillation must be performed in order to be economically practical have been determined by a detailed study of the vacuum distillation of wood rosin. In determining the rates of decomposition of abietic acid, which is present in crude wood rosin to the extent of about 80 to 85%, and of crude wood rosin under various conditions, we have found that the rate of decomposition under good working conditions, namely a low distilling temperature and a high vacuum, approximated one-half of 1% per hour. A brief survey of this study is shown in Figures 2 and 3 of the drawings, which illustrate graphically the rates of decomposition of wood rosin and purified abietic acid, respectively, under 9 to 10 millimeters pressure. It is apparent from these graphs that the decomposition rate is practically a linear function of the temperature.

We have also observed that as the distillation proceeds, the boiling point rapidly rises until a point is reached where the decomposition becomes so rapid that due to the evolution of carbon dioxid gas as one of the non-condensable decomposition products, the vacuum cannot be further maintained and distillation ceases. This phenomenon is the result of the accumulation of the non-volatilized portion in the still, since at normal distillation temperatures this non-volatized portion has a high rate of decomposition, the rate becoming even more pronounced as the temperature rises, as when distilling off the last portion of the volatile constituent. It is thus obvious from these brief observations that the vacuum distillation of wood rosin by ordinary methods is impracticable. We have concluded that in the successful vacuum distillation of wood rosin the following conditions must be considered and a method devised to meet them:

1. The distillation must be carried out very quickly to minimize the loss by decomposition due to heat.

2. The non-volatilized portion must be removed as rapidly as possible from the high temperature zone of fractionation.

3. The distillation must be carried out at as low a temperature as practical, that is, under as high a vacuum as may be economically practical.

4. The wood rosin must be heated in thin layers to minimize superheating and to present a large distilling surface.

These conditions are best met and the usual decomposition products eliminated by the use of a continuous vacuum still in which the crude wood rosin is charged continuously into one part of the apparatus and the non-volatilized residue continuously removed from another part. The distillation carried out in this way necessitates that the rosin be held for a minimum time interval at the distilling temperature. It further effects the removal of the non-volatilized portion from the high temperature zone, the decomposition of which tends to decrease the vacuum and hence raise the boiling point, and consequently the rate of decomposition. Furthermore, the continuous removal of the non-volatilized residue is a more favorable condition for distilling off the volatile portion, since it is obvious that the partial vapor pressure of the volatile constituent decreases as the proportion of the non-volatilized constituent increases. The continuous removal of the non-volatilized portion of the wood rosin, therefore, constitutes the basis of this invention.

Figure 1 of the drawings illustrates diagrammatically a type of apparatus especially adapted for carrying out our method of distillation.

In using apparatus of the type illustrated, an inferior grade of wood rosin is charged into a tank 1 provided with heating coils 2 or other suitable heating means for melting the rosin. Said tank 1 is connected by means of a valve controlled pipe 3 to the upper end of an inclined distilling tube 4, said distilling tube 4 being provided with a jacket 5 for the circulation of a suitable heating medium, such as high flash mineral oil, superheated steam, and the like. Said distilling tube 4 discharges at its lower end into a receiving tank 6 having a lower valve controlled outlet 7. An oppositely inclined condenser 8 is connected to said distilling tube 4 at a point 9 above the opening of the intake pipe 3 into said distilling tube 4. Said condenser 8 is provided with a jacket 10, for the circulation of a cooling medium, and discharges into a receiving tank 11. A suitable source of vacuum (not shown) is connected by means of a pipe 12 to said receiving tank 11, whereby the desired vacuum may be produced in the apparatus. Said tank 11 is also provided with a lower valve controlled pipe 13. The temperature of the distilling tube 4 is first raised to between 200–260° C., which is the distilling temperature of wood rosin under a good vacuum. The distilling system is then evacuated to as high a point as is practical, which may be from 1 to 10 millimeters absolute pressure. The melted wood rosin is then charged into distilling tube 4 at such a rate that the volatile light colored constituents are distilled off and pass over into the condenser 8, where they are condensed and flow into receiver 11. Simultaneously and continuously, the non-volatilized constituent flows down the tube 4 into the receiver 6. For practical purposes, the leg 14 between the end of the condenser tube 4 and the level 15 of the liquid in the receiver 6 may be of sufficient height to permit the non-volatilized residue to be drawn off from the receiver 6 through the pipe 7 without breaking the vacuum in the system.

The actual operation of the distilling apparatus is capable of wide variation depending upon the quality of the distillate and residue desired. By the use of this type of still, high grade wood rosin varying the quality from W—W to X grades can be obtained from inferior grades of said rosin in good yield.

It will be apparent that in distilling wood rosin in an apparatus such as here illustrated diagrammatically, any grade of refined wood rosin may be obtained depending upon the speed at which the rosin is charged into the still and the temperature of the heating medium. While we have shown the distilling tube to be inclined at an angle of substantially 45°, other degrees of incline may be employed, or the distilling tube may be set vertically. It is also evident that instead of drawing off the products from the receivers 6 and 11 intermittently, means may be provided for discharging said products continuously. The important feature of our invention is that both the non-volatilized residue and the volatile distillates are removed continuously and rapidly from the heated zone in order that decomposition with its consequent deleterious effect may be minimized.

We are aware that many changes may be made, and numerous details of the process may be varied through a wide range without departing from the principles of this invention, and we therefore do not purpose limiting the patent granted hereon, otherwise than necessitated by the prior art.

We claim as our invention:

1. The process of refining wood rosin, which comprises subjecting a thin flowing film of wood rosin in a heated zone under a vacuum of from 1 to 10 mm. absolute pressure to a temperature of from 200 to 260° C. to continuously volatilize a portion of the rosin and continuously removing from said heated zone the non-volatilized residue as rapidly as formed, whereby decomposition of said non-volatilized residue is largely prevented and the high vacuum may be continuously maintained.

2. The process of refining wood rosin, which comprises flowing a thin film of wood rosin under a vacuum of from 1 to 10 mm. absolute pressure over an inclined surface heated to a temperature of from 200 to 260° C., continuously removing the volatilized portion of said rosin from the zone of said surface and continuously drawing off the non-volatilized residue as rapidly as said residue flows from the lower end of said surface, whereby decomposition of said residue is largely prevented and said vacuum can be continuously maintained.

In testimony whereof, we have hereunto subscribed our names at Carrollville, Milwaukee County, Wisconsin.

IVAN GUBELMANN.
HENRY R. LEE.